(12) United States Patent
Suzuki et al.

(10) Patent No.: US 7,140,347 B2
(45) Date of Patent: Nov. 28, 2006

(54) SWIRL FORMING DEVICE IN COMBUSTION ENGINE

(75) Inventors: Kozo Suzuki, Kobe (JP); Yoji Fukami, Kakogawa (JP); Yasuhiro Kuji, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/069,133

(22) Filed: Mar. 1, 2005

(65) Prior Publication Data
US 2005/0193976 A1 Sep. 8, 2005

(30) Foreign Application Priority Data
Mar. 4, 2004 (JP) .............................. 2004-059962

(51) Int. Cl.
*F02B 31/04* (2006.01)
*F02B 31/08* (2006.01)
(52) U.S. Cl. ....................... 123/306; 123/586
(58) Field of Classification Search ................ 123/306, 123/308, 432, 531, 533, 586
See application file for complete search history.

(56) References Cited

U.S. PATENT DOCUMENTS

| | | | | |
|---|---|---|---|---|
| 3,364,911 A | * | 1/1968 | Baudry et al. .............. | 123/432 |
| 4,196,701 A | * | 4/1980 | Tamura et al. .............. | 123/308 |
| 4,313,410 A | * | 2/1982 | Kunii et al. ................. | 123/432 |
| 4,455,988 A | * | 6/1984 | Zwierzelewski ............ | 123/308 |
| 4,467,760 A | * | 8/1984 | Namba et al. .............. | 123/308 |
| 6,092,503 A | * | 7/2000 | Ohsuga et al. ............. | 123/308 |
| 6,938,613 B1 | * | 9/2005 | Tamura et al. .............. | 123/531 |
| 2004/0194755 A1 | * | 10/2004 | Shiraishi et al. ............ | 123/295 |

FOREIGN PATENT DOCUMENTS

JP 2003-113719 4/2003

* cited by examiner

*Primary Examiner*—Erick R Solis

(57) ABSTRACT

To provide an improved swirl forming device in a combustion engine, which is effective to promote a vigorous and massive swirling motion of the charge mixture within the combustion chamber, the swirl forming device includes an auxiliary passage (24) for introducing an auxiliary gas, which may be either air or a charge mixture, into the combustion chamber (9) from a location immediately upstream of the intake port (70) that is selectively opened and closed by the intake valve (10). This auxiliary passage (24) has an open end (25) positioned adjacent the exhaust port (80), such that when viewed from top in a direction conforming to the longitudinal axis (CC) of the cylinder bore (3), the auxiliary gas is introduced in a direction different from the direction (N) normal to the inner peripheral surface (3a) of the cylinder bore (3) to thereby form a swirl (S) along the inner peripheral surface (3a) of the cylinder bore (3).

11 Claims, 3 Drawing Sheets

SWIRL FORMING DEVICE IN COMBUSTION ENGINE

BACKGROUND OF THE INVENTION

1. Field of the Invention

The present invention relates to a swirl forming device in a combustion engine, which forms a swirling flow of the charge mixture (i.e., the air-fuel mixture) within the combustion chamber when the combustion engine is operated at a low load condition such as occurring during idling and abrupt deceleration.

2. Description of the Prior Art

An combustion engine which uses a lean mixture of fuel and air has long been known in the art. In this combustion engine operating with the lean air-fuel mixture, during a low load operating condition of the engine the lean air-fuel mixture is supplied and, at the same time, the swirl of the lean air-fuel mixture is developed within the combustion chamber, for the purpose of increasing combustion efficiency and, also, reducing fuel consumption.

In recent years, a swirl forming device has been suggested for an combustion engine of a double intake valve type, in which two bypass passages, through which air from the atmosphere bypasses the throttle valve, are employed. Those bypass passages have exit openings communicated with respective portions of the intake passages adjacent the intake ports that are positioned downstream of the throttle valve with respect to the direction of flow of an intake gas of the engine, so that the air flowing through those bypass passages can be jetted into the combustion chamber to form a swirl of the intake gas. See, for example, the Japanese Laid-open Patent Publication No. 2003-113719.

In the conventional swirl forming device of the type referred to above, the air flowing through the bypass passages is merged at a portion of the intake passage upstream of the intake valves with the air-fuel mixture then flowing through the main intake passage and is then introduced into the combustion chamber from a portion of each port adjacent the outer periphery of the combustion chamber. Accordingly, it does not appear that the position, at which the air flowing through the bypass passages is introduced into the combustion chamber, is well defined to achieve an efficient development of the swirl. In other words, the air flowing through the bypass passages and then jetted into the combustion chamber from a position adjacent the outer periphery of the combustion chamber collides against the peripheral surface of the combustion chamber and the top face of a reciprocating piston and, therefore, no swirling flow of the charge mixture can be smoothly developed.

Thus, the conventional swirl forming device of the design discussed above acts to develop the swirl of the intake gas merely by biasing the flow of the intake gas (the air-fuel mixture and the air) being introduced into the combustion chamber through the intake valves and, therefore, it has been found difficult to promote a vigorous and massive swirling motion. For this reason, with the conventional swirl forming device, the combustion efficiency cannot be sufficiently increased particularly when the lean air-fuel mixture is employed, and, therefore, hydrocarbons in the exhaust gas cannot be sufficiently reduced.

SUMMARY OF THE INVENTION

In view of the foregoing problems and inconveniences inherent in the conventional swirl forming devices, the present invention is intended to provide an improved swirl forming device in a combustion engine, which is effective to promote a vigorous and massive swirling motion of an intake gas within a combustion chamber of the engine.

In order to accomplish the foregoing object, the present invention provides a swirl forming device in a combustion engine having intake and exhaust ports opening into a combustion chamber, which device includes an auxiliary passage for introducing an auxiliary gas, which may be either air or an air-fuel mixture, into the combustion chamber from a location immediately upstream of the intake port, the intake port being selectively opened and closed by an intake valve. This auxiliary passage has an open end positioned at the location immediately upstream of the intake port and adjacent the exhaust port, such that when viewed from top in a direction conforming to a longitudinal axis of a cylinder bore, the auxiliary gas is introduced in a direction different from a direction normal to an inner peripheral surface of the cylinder bore to thereby form a swirl along the inner peripheral surface of the cylinder bore.

According to the present invention, the auxiliary gas flowing through the auxiliary passage and then introduced from upstream of the intake port is injected from a portion of the intake port adjacent the exhaust port, in a direction different from the direction normal to the inner peripheral surface of the cylinder bore when viewed in a direction conforming to the longitudinal axis of the cylinder bore, that is, in an inclined direction. Accordingly, the auxiliary gas so introduced into the combustion chamber smoothly spreads without hard colliding against any of the inner peripheral surface of the cylinder bore and the top face of the reciprocating piston and without being inverted backwardly, representing a generally oval pattern of spread deploying from the intake port towards the exhaust port when viewed from top in a direction confirming to the longitudinal axis of the cylinder bore.

Because of the above, a vigorous and massive swirl of an intake gas of the engine including the air-fuel mixture and the auxiliary gas, and traveling along the inner peripheral surface of the cylinder bore, can be formed within the combustion chamber. By the effect of the swirling energies of the swirl, the intake gas within the combustion chamber can be effectively mixed and, accordingly, even at the low load engine operating condition, in which the intake gas is adjusted to a lean air-fuel mixture, a substantially homogeneous combustion of the intake gas takes place within the combustion chamber, with the combustion efficiency increased consequently, resulting in a satisfactory reduction of the exhaust emissions containing hydrocarbons.

In a preferred embodiment of the present invention, the open end of the auxiliary passage may be positioned downstream of an intake passage with respect to a valve guide for the intake valve. This allows the open end of the auxiliary passage to be easily formed without being interfered by the presence of the valve guide for the intake valve.

In another preferred embodiment of the present invention, the swirl forming device may also include a control valve for selectively opening and closing the auxiliary passage in dependence on an engine operating condition. This is particularly advantageous in that the auxiliary passage can be controlled to communicate with the intake port by actuating the control valve when the combustion engine is operated, for example, at a low load operating condition that takes place during idling or at the time of an abrupt deceleration. With such control, the swirl can be formed within the combustion chamber by the auxiliary gas, introduced thereinto from the auxiliary passage, to thereby increase the combustion efficiency during the low load engine operating condition at which the intake gas is adjusted to a lean air-fuel mixture.

In a further preferred embodiment of the present invention, the auxiliary passage may be a bypass passage for introducing an air from upstream of a throttle valve in an intake passage of the engine into the combustion chamber, having bypassed the throttle valve. According to this feature, the bypass passage employed largely in the conventional combustion engine for increasing the amount of air to be introduced into the combustion engine during idling can be used as the auxiliary passage in the present invention merely by altering the position and orientation of the open end thereof. Also, the idle speed control valve employed in association with the conventional combustion engine for adjusting a sectional area of the bypass passage can be utilized as a control valve for selectively opening and closing the auxiliary passage in the present invention without altering in anyway whatsoever. Therefore, merely by modifying relevant portions of the existing combustion engine, the swirl device of the present invention can easily be installed.

In a still further preferred embodiment of the present invention, the intake and exhaust ports may be positioned substantially symmetrically on respective sides of a diametrical line drawn to pass across a longitudinal axis of the combustion chamber, respectively, and, at the same time, the open end of the auxiliary passage may be positioned at the location immediately upstream of and adjacent the intake port, and between a first position closest to the exhaust port, and a second position displaced 90° from such first position towards an outside of the combustion chamber around the intake port. This allows the vigorous swirl of a large radius of curvature to be developed within the combustion chamber.

In the case of the combustion engine being of a four valve type, that is, having a pair of intake ports and a pair of exhaust ports, it is preferable that the open end of the auxiliary passage is positioned adjacent one of the intake ports.

BRIEF DESCRIPTION OF THE DRAWINGS

In any event, the present invention will become more clearly understood from the following description of a preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A swirl forming device in a combustion engine designed in accordance with the present invention will now be described in connection with preferred embodiments thereof with reference to the accompanying drawings.

Figure 1:
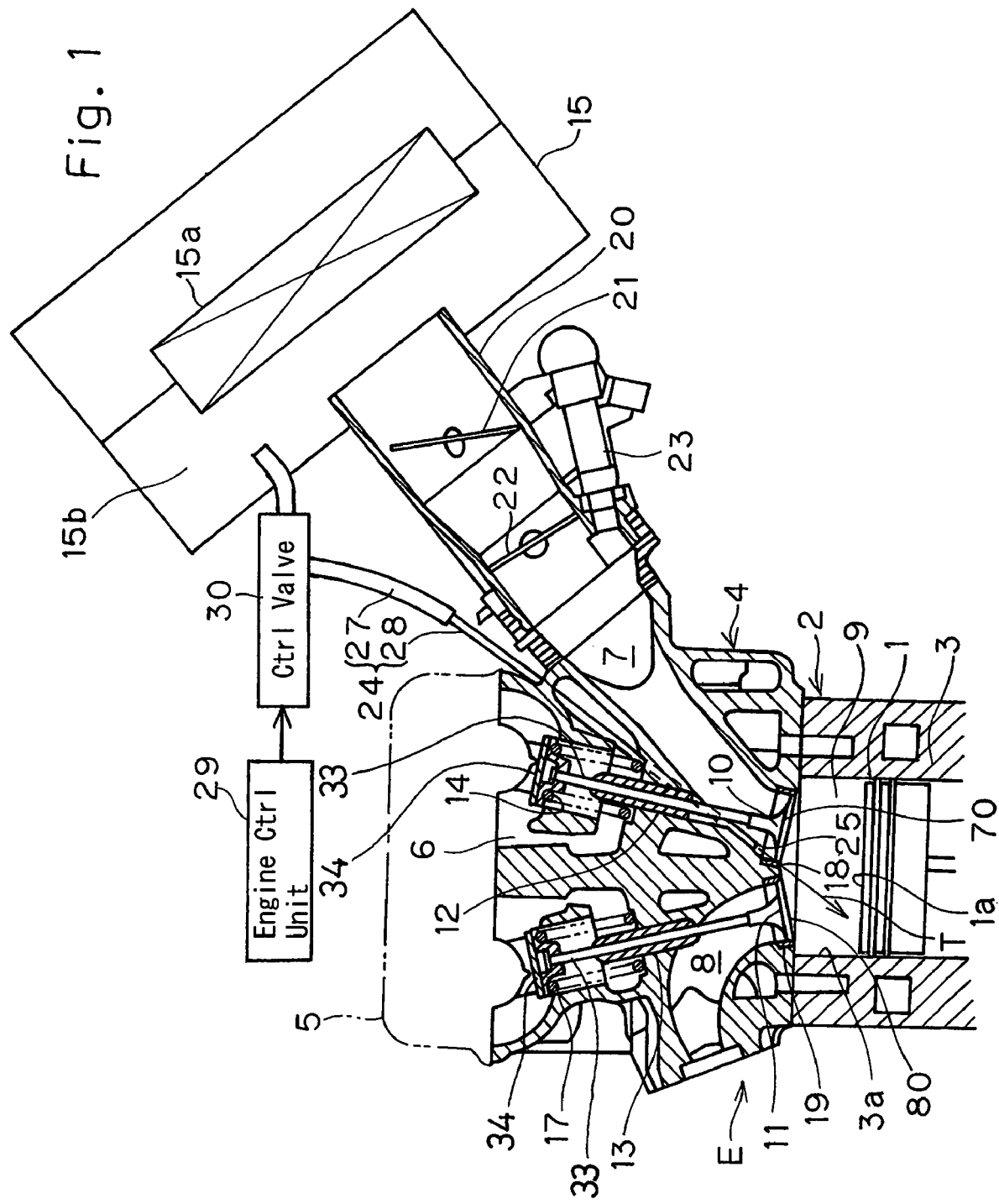
FIG. 1 is a schematic longitudinal sectional view showing a swirl forming device in a combustion engine according to a preferred embodiment of the present invention.

Referring particularly to FIG. 1 showing an essential portion of the combustion engine E, which incorporates the swirl forming device according to a first embodiment of the present invention, the combustion engine E shown therein is assumed as mounted on, for example, a motorcycle and includes a cylinder block 2, fixedly mounted on a crankcase (not shown), a cylinder head 4 mounted atop the cylinder block 2, and a cylinder head cover 5 mounted on the cylinder head 4 and positioned on one side of the cylinder head 4 opposite to the cylinder block 2. The cylinder block 2 has a cylinder bore 3 defined therein, within which a reciprocating piston 1 moves up and down, with a combustion chamber 9 defined within the cylinder bore 3 and above the reciprocating piston 1. A space delimited between the cylinder head 4 and the cylinder head cover 5 provides a valve chamber 6, in which a valving mechanism of the engine is accommodated.

So far shown, the cylinder head 4 has a pair of intake ports 70 and a pair of exhaust ports 80 defined therein, all of which are communicated with the combustion chamber 9. The cylinder head 4 also has an intake passage 7 defined therein in communication with the intake ports 70, and also has an exhaust passage 8 defined therein in communication with the exhaust ports 80. As a matter of design, the intake ports 70 are adapted to be selectively opened and closed by respective intake valves 10 and, similarly, the exhaust ports 80 are adapted to be selectively opened and closed by respective exhaust valves 11.

The intake valves 10 have a valve stem 33 slidably accommodated within a respective valve guide 12, defined in the cylinder head 4, for movement up and down and normally biased by a respective valve spring 14 so as to cause the intake valve 10 to be seated on a valve seat 18 to thereby close the associated intake pint 70. Similarly, the exhaust valves 11 have a valve stem 33 slidably accommodated within respective valve guide 13, defined in the cylinder head 4, for movement up and down and normally biased by a respective valve spring 17 so as to cause the exhaust valve 11 to be seated on a valve seat 19 to thereby close the associated exhaust port 80.

As is well known to those skilled in the art, an upper end of each of the valve stems 33 is adapted to receive a driving force of a cam of the value mechanism (not shown) and, hence, when the respective valve stem 33 is knocked down against the associated valve spring 14 or 17 by the driving force acting on the upper end thereof, the corresponding intake or exhaust port 70 or 80 is opened.

The intake passage 7 has an upstream end remote from the combustion chamber 9, which is fluidly connected through an air supply tube 20 with an air cleaner 15 having a cleaner element or filter 15a. Specifically, the intake passage 7 is so formed as to extend from a downstream chamber 15b of the air cleaner 15, defined downstream of the cleaner element 15a to the intake ports 70 through the air supply tube 20 and a passage defined in the cylinder head 4. A choke valve 21 and a throttle valve 22 for regulating the flow of the air being introduced through the intake passage 7 are operatively disposed within a portion of the air supply tube 20, which forms a part of the intake passage 7. Also, a fuel injecting nozzle 23 for injecting a controlled amount of fuel is disposed at a portion of the air supply tube 20 downstream of the throttle valve 22 so that the controlled amount of fuel so injected can admix with the air then flowing through the intake passage 7 towards the combustion chamber 9. Thus, it will readily be seen that within the intake passage 7 the fuel injected from the fuel injecting nozzle 23 is mixed with the air flowing from the air cleaner 15 towards the combustion chamber 9 to thereby form an air-fuel mixture, which is in turn supplied into the combustion chamber 9 through the intake ports 70.

As an auxiliary gas other than the air-fuel mixture introduced through the intake passage 7 in the manner described above, air in the downstream chamber 15b of the air cleaner 15 is introduced into the combustion chamber 9 defined within the cylinder bore 3 and above the reciprocating piston 1. The auxiliary air or the auxiliary gas is introduced into the combustion chamber 9 through a bypass passage 24 bypassing the throttle valve 22 so that the auxiliary air can be introduced into the combustion chamber 9 from a portion of the intake passage 7 immediately upstream of one of the intake ports 70 with respect to the direction of flow thereof towards the combustion chamber 9. This bypass passage 24 defines an auxiliary passage within the meaning of the present invention.

The bypass passage or auxiliary passage 24 referred to above includes an air drawing path 27 in the form of a tube, fluidly connected with the downstream chamber 15b of the air cleaner 15, and an air introducing path 28 fluidly connected at one end with the air drawing path 27 and at the opposite end disposed as an open end 25 in that portion of the intake passage 7 immediately upstream of the intake port 70. In the air drawing path 27 is disposed a control valve 30 which is controlled by an engine control unit 29 to selectively open and close the bypass passage 24. The engine control unit 29 referred to above operates in dependence on a predetermined engine operating condition.

The bypass passage 24 and the control valve 30 both referred to above are similar in structure to a bypass passage and an idling speed control valve both largely employed in the conventional combustion engine for stabilization of the engine revolution during the idling. However, the present invention is featured particularly in the specific position and the specific orientation of the open end 25 of the bypass passage 24, which are carefully chosen to effectively promote the swirling motion within the combustion chamber as will be detailed subsequently.

Figure 2:
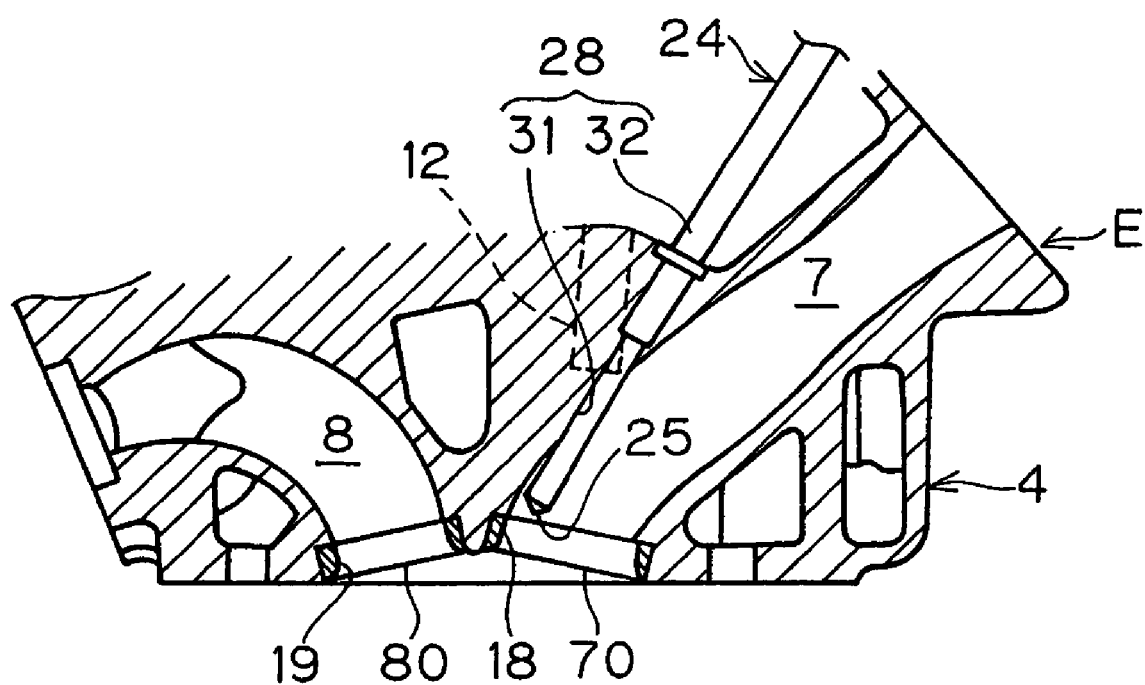
FIG. 2 is a fragmentary longitudinal sectional view showing a cylinder head of the combustion engine as viewed at a location different from that shown in FIG. 1.

Referring now to FIG. 2, there is shown a fragmentary longitudinal sectional representation of the cylinder head 4, taken along a line different from that taken for FIG. 1. As shown therein, the air introducing path 28 is made up of a throughhole 31 defined in the cylinder head 4 so as to extend in a fashion, inclined relative to a center line of the intake passage 7, from a position downwardly of the valve guide 12 to a position immediately above the valve seat 18, and a connecting pipe 32 press-fitted into an upper end of the throughhole 31. Hence, the open end 25 of the bypass passage 24 is positioned at that portion of the intake passage upstream of the intake port 70. It is, however, to be noted that in place of the press-fitted connection between the throughhole 31 and the connecting pipe 32 to define the air introducing path 28, such air introducing path 28 may be formed by machining the cylinder head 4 to define a passage, or forming a passage in the cylinder head 4 during the casting of the latter, and then connecting a pipe or tube to an open end of such passage opening at an upper end of the cylinder head 4 to thereby complete the air introducing path 28.

Figure 3:
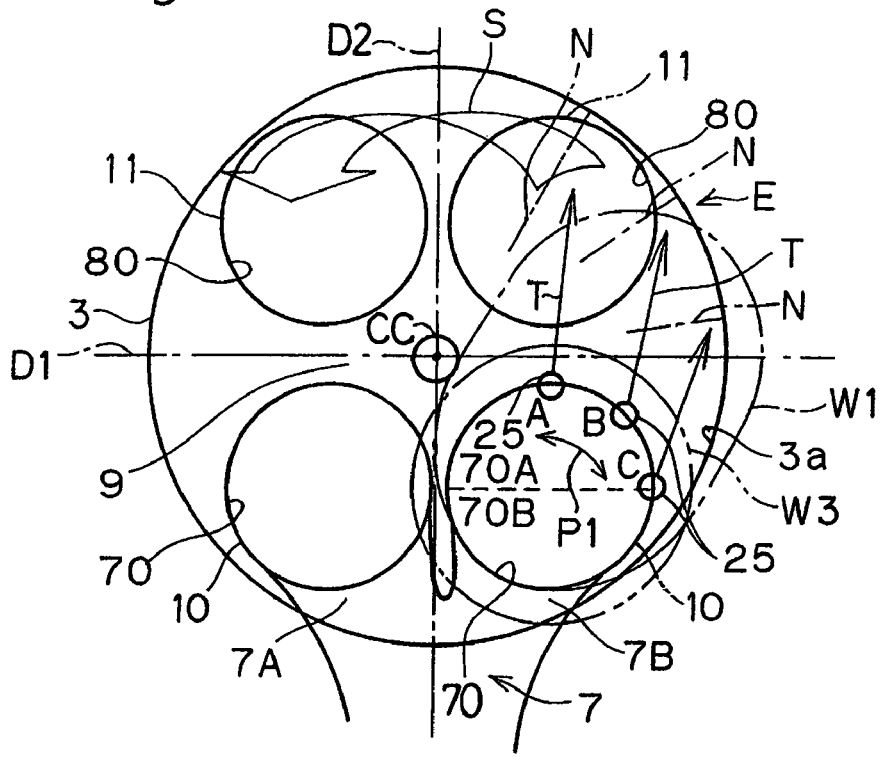
FIG. 3 is an explanatory plan view showing the manner of operation of the swirl forming device of FIG. 1 at a low load engine operating condition.

FIG. 3 diagrammatically illustrates the manner of operation of the swirl forming device at a low load engine operating condition, as viewed from top in a direction conforming to a longitudinal axis CC of the cylinder bore 3. As discussed hereinbefore, in the illustrated embodiment, the combustion engine E shown is of a four valve type having the pair of the intake ports 70, adapted to be selectively opened and closed by the corresponding intake valves 10, and the pair of the exhaust ports 80 adapted to be selectively opened and closed by the corresponding exhaust valves 11. The pair of the intake valves 10 and the pair of the exhaust valves 11 are arranged substantially symmetrical with respect to and on respective sides of a diametrical line D1 passing across the longitudinal axis CC of the combustion chamber 9 (i.e., the center of the cylinder bore 3) in a direction substantially perpendicular thereto. The intake ports 70 and 70 are supplied with the air-fuel mixture through branch passages 7A and 7B that are ramified in the cylinder head 4 so as to communicate the intake passage 7 with each of the intake ports 70 and 70. The open end 25 of the bypass passage 24 (FIGS. 1 and 2) is positioned within such a region P1 upstream of one of the intake ports 70 (the right-side intake port 70 in FIG. 3) and adjacent one of the exhaust ports 80 and also adjacent the inner peripheral surface 3a of the cylinder bore 3 that the air can be introduced into the combustion chamber 9 in a direction different from the direction N normal to the inner peripheral surface 3a of the cylinder bore 3.

It is to be noted that as an alternative the open end 25 of the bypass passage 24 may be positioned at a portion adjacent to and upstream of the other of the intake ports 70 (i.e., the left-side intake port 70 in FIG. 3), in which case the open end 25 is to be positioned at a portion symmetrical with respect to another diametrical line D2 passing across the longitudinal axis CC and perpendicular to the diametrical line D1, relative to that shown in and described above with reference to FIG. 3.

The operation of the combustion engine E of the structure hereinbefore described will now be described. When the combustion engine E is operated under idling or at a low load condition such as occurring at the time of an abrupt deceleration, the throttle valve 22 is adjusted to a substantially closed position, in which the intake passage 7 is substantially closed. At the same time the control valve 30 is actuated by the engine control unit 29, then detecting the low load engine operating condition, to open the air drawing path 27, and the amount of the fuel jetted from the fuel injection nozzle 23 is reduced to a value appropriate to the low load engine operating condition. Accordingly, during the low load engine operating condition, the lean air-fuel mixture is introduced into the combustion chamber 9.

On the other hand, the air supplied through the bypass passage 24 to that portion of the intake passage 7 upstream of the intake port 70, that is, the auxiliary air, is introduced into the combustion chamber 9 from the position within the region P1, shown by A-B-C, adjacent the exhaust port 80 immediately upstream of the intake port 70, that is, from the open end 25 of the bypass passage 24 that is located offset from the longitudinal axis CC of the combustion chamber 9. At this time, as the auxiliary air is so introduced into the combustion chamber 9 in the manner described above, the auxiliary air travels in a direction T inclined relative to the inner peripheral surface 3a of the cylinder bore 3 and different from the direction N normal to the inner peripheral surface 3a when viewed in a direction generally in alignment with the longitudinal axis of the cylinder bore 3. Because of this, the auxiliary air entering the combustion chamber 9 spreads without colliding hard against the inner peripheral surface of the cylinder bore 3 and the top face 1a of the reciprocating piston 1 shown in FIG. 1. The pattern of spread of an intake gas containing the air-fuel mixture and the auxiliary air so introduced, when viewed from top in a direction conforming to the longitudinal axis of the cylinder bore 3, represents a generally oval shape, as shown by the single-dotted line W1, deploying from the intake port 70 towards the inner peripheral surface 3a of the cylinder bore 3.

For comparison purpose, the pattern of spread of an intake gas containing air-fuel mixture only, which takes place if no auxiliary air is injected from the open end 25 of the bypass passage 24 open at a location upstream of the intake port 70, is shown by the double-dotted line W3 in FIG. 3. As shown therein, this pattern of spread of the intake gas shown by the double-dotted line W3 represents a substantially round shape when viewed from top in a direction confirming to the longitudinal axis of the cylinder bore 3.

As described above, within the combustion chamber 9, a vigorous swirl S of a large radius of curvature traveling along the inner peripheral surface 3a of the cylinder bore 3 can be deployed by the action of the intake gas spreading in the substantially oval pattern W1. By the effect of the swirling energies of the swirl S, the intake gas supplied from the intake port 70 into the combustion chamber 9 can be effectively mixed. Accordingly, even at the low load engine operating condition, in which the intake gas is adjusted to a lean air-fuel mixture, a substantially homogeneous combustion of the intake gas takes place within the combustion chamber 9, with the combustion efficiency increased consequently, resulting in a satisfactory reduction of the exhaust emissions containing hydrocarbons.

On the other hand, when the engine is operated under a high load condition, the throttle valve 22 shown in FIG. 1 is adjusted to a full open position, in which the plate-like throttle valve 22 is disposed parallel to a longitudinal sense of the intake passage 7, while the control valve 30 is actuated by the engine control unit 29, then detecting the high load engine operating condition, to close the air drawing path 27 of the bypass passage 24. Also the amount of fuel jetted from the fuel injection nozzle 23 is increased to a value appropriate to the high load engine operating condition. Accordingly, an increased amount of the air-fuel mixture is introduced into the combustion chamber 9, allowing the combustion engine E to provide a required engine output.

As hereinabove described, if the open end 25 of the bypass passage 24 is positioned at any location between the position A closest to the exhaust port 80 and the position B displaced about 45° from the position A towards the outside of the combustion chamber 9 around the intake port 70 as shown in FIG. 3, the auxiliary air can be introduced into the combustion chamber 9 so that the vigorous swirl S of a large radius of curvature can be effectively developed. It is, however, to be noted that even if the open end 25 of the bypass passage 24 is positioned at a location between the position B and the position C displaced 90° from the position A towards the outside of the combustion chamber 9, substantially vigorous and massive swirl S having a large radius of curvature can be developed.

In other words, if in this four valve type combustion engine E the intake port 70 is divided into a first semicircular half 70A, close to one of the exhaust ports 80 closest to such intake port 70, and a second semicircular half 70B remote from such one of the exhaust ports 80, the open end 25 of the bypass passage 24 is preferably located at a position within the first semicircular half 70A of the intake port 70 and spaced radially outwardly from the longitudinal axis CC of the combustion chamber 9, hence, the cylinder bore 3.

Also, in the foregoing embodiment, since the open end 25 of the bypass passage 24 in FIG. 2 immediately upstream of the intake port 70 is formed at a location below the valve guide 12 for the intake valve 10, the open end 25 can easily be formed without being interfered by the presence of the valve guide 12 for the intake valve 70.

In addition, by simply modifying the bypass passage employed in the conventional combustion engine for increasing the amount of air to be introduced into the combustion engine during idling in such a way as to alter the position and orientation of the open end 25 shown in FIG. 1, such bypass passage can be used in the swirl forming device of the design described above, as an auxiliary passage for introducing the auxiliary air for the formation of the swirl. At the same time, the idle speed control valve employed in association with the conventional combustion engine for stabilizing the revolution during idling can be utilized as the control valve 30 for selectively opening and closing the auxiliary passage 24 without altering in anyway whatsoever and, therefore, the swirl forming device of the present invention can easily be employed in the existing combustion engine.

It is to be noted that in the foregoing embodiment the present invention has been shown and described as applied to the combustion engine E of a fuel injection type and, at the same time, the air flowing through the bypass passage 24 has been described as used as the auxiliary gas to be introduced into the combustion chamber 9 from the position immediately upstream of the intake port 70 to eventually form the swirl S. However, the present invention can equally be applied to any combustion engine of a type utilizing a carburetor and, even in this case, effects similar to those described hereinabove can be obtained.

Particularly where the present invention is applied to the combustion engine of the type utilizing the carburetor, the carburetor and the associated throttle valve may be bypassed to allow a portion of air to be introduced into the auxiliary passage. Alternatively, however, an arrangement may be made that without the carburetor being bypassed, but with the throttle valve downstream of the carburetor being bypassed, a portion of the air-fuel mixture flowing from the carburetor may be drawn as an auxiliary gas via the auxiliary passage and may then be introduced into the combustion chamber 9 from a position immediately upstream of the intake port 70.

Figure 4:
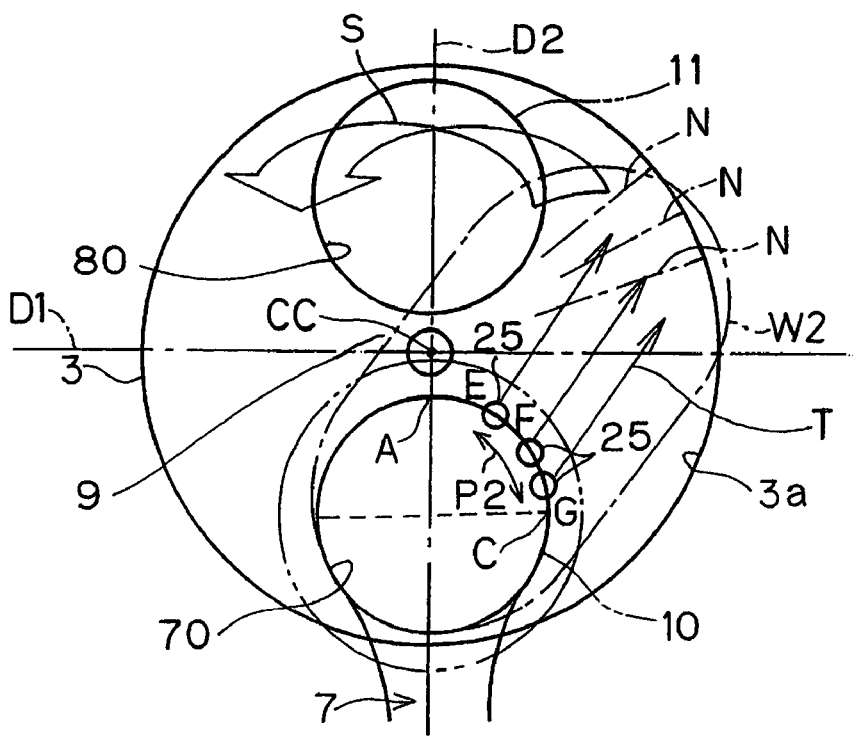
FIG. 4 is a view similar to FIG. 3, showing the manner of operation of the swirl forming device according to another preferred embodiment of the present invention.

FIG. 4 is a schematic plan view showing a second preferred embodiment of the present invention that is applied to a two valve type combustion engine, i.e., a combustion engine of a type having a single intake valve 10 and a single exhaust valve 11. In this two valve type combustion engine, the intake and exhaust valves 10 and 11 are symmetrically positioned on respective sides of the diametrical line D1, passing across the longitudinal axis CC of the combustion chamber 9 (i.e., the center of the cylinder bore 3) in a direction substantially perpendicular thereto, and lie on a common or the another diametrical line D2 passing across the longitudinal axis CC in a direction perpendicular to the diametrical line D1.

Even in this two valve type combustion engine, the open end 25 of the bypass passage 24 is positioned at the location between the position A and the position C, for example, at the location within the region P2, shown by E-F-C, adjacent the exhaust port 80 and immediately upstream of the intake port 70, so that the direction T can be defined, in which the air introduced into the combustion chamber 9 can travel in a direction different from the direction N normal to the inner peripheral surface 3a of the cylinder bore 3 when viewed from top in a direction conforming to the longitudinal axis of the cylinder bore 3. By so doing, the pattern of spread of the intake gas so introduced, when viewed from top, represents a generally oval shape, as shown by the single-dotted line W2, deploying from the intake port 70 towards the inner peripheral surface 3a of the cylinder bore 3.

In FIG. 4, the reference character E represents the position displaced about 15 to 25° from the position A in the intake port 70 closest to the exhaust port 80 towards the outside of the combustion chamber 9; the reference character F represents a position displaced about 40 to 50° from the position A towards the outside of the combustion chamber 9; and the reference character G represents a position displaced about 70 to 80° from the position A towards the outside of the combustion chamber 9. In order to promote the vigorous swirl S, the open end 25 of the bypass passage 24 is positioned at any location most preferably between the positions E and F, and next preferably between the positions F and G.

Accordingly, even in this second embodiment, the vigorous and massive swirl S having a large radius of curvature traveling along the inner peripheral surface 3a can be formed within the combustion chamber 9 by the effect of the introduced intake gas, (the air-fuel mixture and the air) spreading in the oval pattern when viewed from top in a direction confirming to the longitudinal axis of the cylinder bore 3, as is the case with that in the foregoing embodiment. Hence, by the effect of the swirling energies of the swirl S of the intake gas, the intake gas within the combustion chamber 9 can be effectively mixed and, therefore, even at the low load engine operating condition, in which the intake gas is adjusted to the lean air-fuel mixture, a substantially homogeneous combustion of the intake gas takes place within the combustion chamber, with the combustion efficiency increased consequently, resulting in a satisfactory reduction of the exhaust emissions containing hydrocarbons.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A swirl forming device in a combustion engine having intake and exhaust ports opening into a combustion chamber, which device comprises:
    an auxiliary passage for introducing an auxiliary gas, which may be either air or an air-fuel mixture, into the combustion chamber from a location immediately upstream of the intake port, the intake part being selectively opened and closed by an intake valve;
    the auxiliary passage having an open end positioned at the location immediately upstream of the intake port and adjacent the exhaust port, such that when viewed from top in a direction conforming to a longitudinal axis of a cylinder bore, the auxiliary gas is introduced in a direction different from a direction normal to an inner peripheral surface of the cylinder bore to thereby form a swirl along the inner peripheral surface of the cylinder bore, wherein the open end of the auxiliary passage is positioned downstream of an intake passage of the engine with respect to a valve guide for the intake valve, wherein the intake and exhaust ports are positioned substantially symmetrically on respective sides of a diametrical line drawn to pass across a longitudinal axis of the combustion chamber, respectively, and wherein the open end of the auxiliary passage is positioned at the location immediately upstream of the intake port and between, when viewed from top in said direction conforming to the longitudinal axis of the cylinder bore, a first position closest to the exhaust port and a second position displaced 90° from such first position towards an outside of the combustion chamber around the intake port.

2. The swirl forming device as claimed in claim 1, further comprising a control valve for selectively opening and closing the auxiliary passage by an engine control unit (ECU) in dependence on an engine operating condition.

3. The swirl forming device as claimed in claim 2, wherein the control valve opens the auxiliary passage during a low load engine operating condition.

4. The swirl forming device as claimed in claim 1, wherein the auxiliary passage is a bypass passage for introducing an introduced air from upstream of a throttle valve in an intake passage of the engine into the combustion chamber, having bypassed the throttle valve.

5. The swirl forming device as claimed in claim 1, wherein each of the intake and exhaust ports are employed in a pair and wherein the open end of the auxiliary passage is positioned adjacent one of the intake ports.

6. In a combustion engine having intake and exhaust ports opening into a combustion chamber with intake passageways and exhaust passageways controlled by intake valves and exhaust valves operatively connected to the respective intake and exhaust ports, the improvement comprising a swirl fanning device by forming a fluidic swirl pattern by introducing an auxiliary fluid during low load engine operating conditions comprising:
    an engine control unit for detecting low load engine operation conditions and providing a lean air-fuel mixture to the combustion chamber compared to normal load engine operation;
    a control valve operatively connected to the engine control unit for opening during low load engine operation conditions; and
    a auxiliary passage connected to the control valve for receiving the auxiliary fluid, the auxiliary passage having an open end positioned at a location immediately upstream of the intake port and adjacent the exhaust port, such that when viewed from top in a direction conforming to a longitudinal axis of a cylinder bore, the auxiliary gas is introduced only on one side of the intake valve in a direction different from a direction normal to an inner peripheral surface of the cylinder bore during low load engine operation to thereby form a swirl pattern along the inner peripheral surface of the cylinder bore, wherein the open end of the auxiliary passage is positioned downstream of an intake passage of the engine with respect to a valve guide for the intake valve, wherein the intake and exhaust ports are positioned substantially symmetrically on respective sides of a diametrical line drawn to pass across a longitudinal axis of the combustion chamber, respectively, and wherein the open end of the auxiliary passage is positioned at the location immediately upstream of the intake port and between, when viewed from top in said direction conforming to the longitudinal axis of the cylinder bore, a first position closest to the exhaust port a second position displaced 90° from such first position towards an outside of the combustion chamber around the intake port.

7. The swirl forming device as claimed in claim 6, wherein the auxiliary passage is a bypass passage for introducing an introduced air from upstream of a throttle valve in an intake passage of the engine into the combustion chamber, having bypassed the throttle valve.

8. The swirl forming device as claimed in claim 6, wherein each of the intake and exhaust ports are employed in a pair and wherein the open end of the auxiliary passage is positioned adjacent one of the intake ports.

9. In a combustion engine having intake and exhaust ports opening into a combustion chamber with intake passageways and exhaust passageways controlled by intake valves and exhaust valves operatively connected to the respective intake and exhaust ports through respective valve guards opening into respective intake and exhaust passageways, the improvement comprising a swirl forming device for forming a fluidic swirl pattern by introducing an auxiliary fluid during low load engine operating conditions from an air cleaner comprising:
  an engine control unit for detecting low load engine operation conditions and providing a lean air-fuel mixture to the combustion chamber compared to normal load engine operation;
  a control valve operatively connected to the engine control unit for opening during low load engine operation conditions; and
  an auxiliary passage connected directly to the air cleaner for receiving the auxiliary fluid and extending to a discharge open end positioned in the intake passageway downstream of the valve guide opening for providing a directional release to the auxiliary fluid, the auxiliary passage is connected to the control valve for controlling the release of auxiliary fluid, the auxiliary passage has the discharge open end positioned at a location immediately upstream of the intake port and between, when viewed from top in a direction conforming to the longitudinal axis of the cylinder bore, a first position closest to the exhaust port and a second position displaced 90° from such position towards an outside of the combustion chamber around the intake port, the auxiliary fluid is introduced only on one side of the intake valve in a direction different from a direction normal to an inner peripheral surface of the cylinder bore during low load engine operation to thereby form an oval swirl pattern towards an inner peripheral surface of the cylinder bore.

10. The swirl forming device as claimed in claim 9, wherein the auxiliary passage is a bypass passage for introducing an introduced air from upstream of a throttle valve in the intake passageway of the engine into the combustion chamber, having bypassed the throttle valve.

11. The swirl forming device as claimed in claim 9, wherein each of the intake and exhaust ports are employed in a pair and wherein the open end of the auxiliary passage is positioned adjacent one of the intake ports.

* * * * *